Jan. 6, 1942.   F. I. NELSON   2,269,344
SELF-ADJUSTING CULTIVATING ATTACHMENT FOR TRACTORS
Filed Oct. 20, 1939   2 Sheets-Sheet 1

INVENTOR.
Frank I. Nelson
BY Sam J. Slotsky
ATTORNEY.

Jan. 6, 1942.          F. I. NELSON                2,269,344
            SELF-ADJUSTING CULTIVATING ATTACHMENT FOR TRACTORS
                    Filed Oct. 20, 1939          2 Sheets-Sheet 2

INVENTOR.
Frank I. Nelson
BY Sam J. Slotky
ATTORNEY.

Patented Jan. 6, 1942

2,269,344

UNITED STATES PATENT OFFICE 2,269,344

SELF-ADJUSTING CULTIVATING ATTACHMENT FOR TRACTORS

Frank I. Nelson, Jackson, Nebr.

Application October 20, 1939, Serial No. 300,422

9 Claims. (Cl. 97—47)

My invention relates to a tractor attachment.

An object of my invention is to provide a cultivating arrangement which prevents side-slipping of tractors on hills or similar slopes and which includes an arrangement for carrying shovels or discs which arrangement is free to move laterally and independently of the tractor itself.

A further object of my invention is to provide means cooperatively associated with the laterally movable means to carry shields.

A further object of my invention is to provide a shield attachment which keeps the shield at a desired height and which allows for raising or lowering of the shield.

A further object of my invention is to provide a pair of units which carry cultivating means thereon with means interposed between such units to maintain the same in a constant plane regardless of lateral movement thereof.

A further object of my invention is to provide a structure of this type which allows manipulation of the shield members from the rear of the tractor and to provide a structure which can be manufactured at a reasonable cost.

Figure 1:
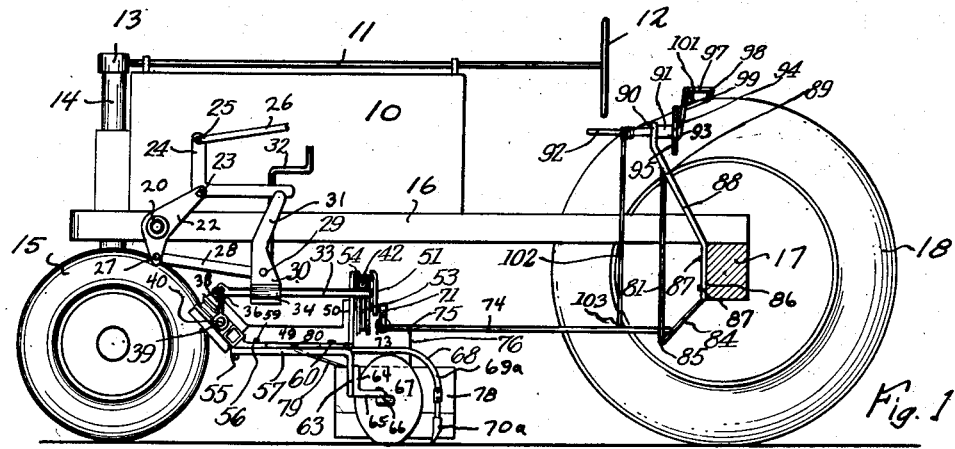
Figure 2:
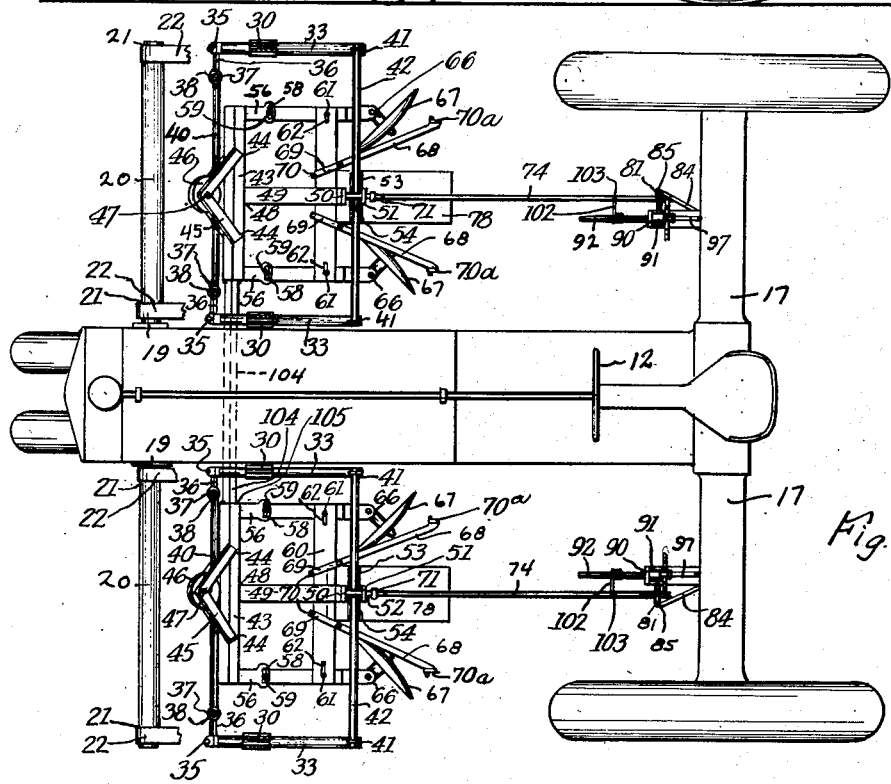
Figure 3:
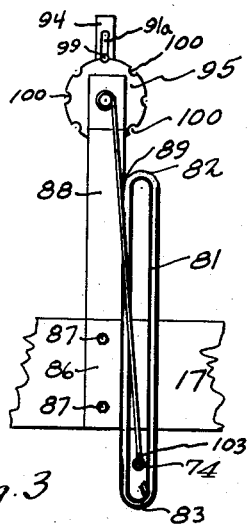
Figure 4:
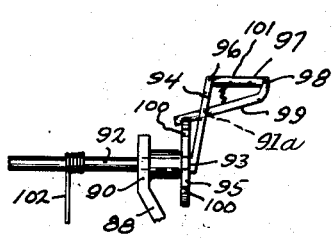
Figure 5:
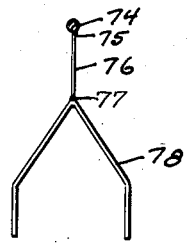
Figure 6:
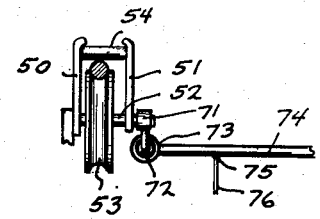

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of a tractor showing the attachment attached thereto, Figure 2 is a plan view, Figure 3 is a detail of the shield raising mechanism, Figure 4 is a further detail of the same, Figure 5 is a further detail, and Figure 6 is a further detail.

I have used the character 10 to designate a tractor hood, a steering rod by the character 11, and a steering wheel by the character 12. The rod 11 engages with a member 13 which drives a spindle 14 which is attached to the tractor forward wheels 15. A lower framework is indicated by the character 16, a rear axle by the character 17 and the rear wheels by the character 18. Brackets 19 are attached to the laterally extending pipe members 20 to which are attached at 21 the arms 22 which are attached to rods 23 which in turn are attached to levers 24 which are pivoted at 25 to rearwardly extending rods 26.

Arms 22 are pivotally attached at 27 to link members 28 which are engaged at 29 with a bracket 30 which extends upwardly into the portion 31 which is engaged with a suitable gear attached to the turning arm 32. The rod 26 passes rearwardly to a suitable control not shown herein since it is not a part of my invention. The rod 26 by forward or rearward movement of the same causes pivoting of the frame about the pipe 20 to cause raising or lowering of the cultivating framework with an additional effect being caused by the rotation of a handle 32.

All of these features are commonly known and my invention contemplates the use of attachable devices to this framework. A further portion of the standard framework are the forwardly extending bars 33 which are attached at 34 to brackets 30. Attached at 35 are inwardly extending rods 36 (see Figure 2). Attached at 37 are forwardly extending bent rods 38 which terminate into eye portions 39, and solidly attached to the portion 39 are the round rods 40. Attached at 41 to the rear of the bars 33 are further lateral rods 42.

It will be noted that there is a similar unit on each side of the tractor. A pair of laterally extending hollow square members 43 are attached at 44 to a pair of brackets 45 which are spaced apart and between which are mounted the pulleys 46 which are journalled at 47 therein. The rods 40 are adapted to ride within the pulleys 46 as shown. Attached at 48 to the member 43 is a rearwardly extending member 49 which extends rearwardly to upright members 50 and 51 (see Figures 1 and 6).

Attached to the member 49 is a shaft 52 upon which is rotatably journalled further pulleys 53. The transverse rods 42 are adapted to be engaged within the upper portions of the pulleys 53 as shown. A roller member 54 is secured between the members 50 and 51 to limit upward movement of the rod 42. Attached at 55 to brackets 56 which brackets are solidly attached to the members 43 are side members 57. The brackets 56 include slots 58 through which are received bolts 59 for securing the same to the members 57.

A pair of further lateral members 60 are attached by means of bolts 61 through suitable slots 62 and the members 60 are attached to the member 49. The members 57 continue into downwardly extending vertical portions 63 to which are attached at 64 members 65 to which are secured at 66 cultivator discs 67 which can be placed at any desired angle as in usual practice. Attached to a member 60 are the further members 68 which are attached by means of straps 69 and bolts 70. The members 68 merge into the downwardly extending portions 69a to which are attached shovels 70a.

Attached at the rear of a shaft 52 is the member 71 which terminates in a small eye bolt 72. Received within the eye bolt 72 is a further eye 73 which is attached to a rearwardly extending rod 74. Attached at 75 to the rod 74 is a cable 76 which is attached at 77 to a pair of shield members 78. The shield members 78 are attached to a bar 79 at the further end thereof which bar is pivoted at 80 to the member 49. The rod 74 extends rearwardly and is received between a guide member which is in the form of an elongated slot and which guide member is indicated by the character 81 which can be made of a rod material including the upper limit 82 and lower limit 83.

A brace member 84 is attached at 85 to the member 81 and which brace member is attached to a vertical member 86. The member 86 is suitably attached at 87 to the rear axle of the tractor and the member 86 continues into a portion 88 and the upper portion 82 of the member 81 is suitably attached at 89 to the member 88. The member 88 continues into further vertical portions 90 to which is secured a journal 91. Passing through the journal 91 is a reel shaft 92 which is attached at 93 to an upwardly extending lever 94.

A circular retaining member 95 is solidly attached to the journal 91. Attached at 96 to the member 94 is a horizontal hand member 97 to which is pivoted at 98 a retractile member 99 which passes through a suitable slot 91a in the member 94 and which is adapted to be received within any of a series of semi-circular openings 100 in the member 95. A compression spring 101 is attached between the members 97 and 99. Attached to the reel member 92 is a cable 102 which extends downwardly and is attached at 103 to the rear portion of the rod 74.

It will now be seen from the foregoing description that the entire arrangement of discs and shovels are carried forwardly together with the tractor as the same is driven ahead through the engagement of the transverse rods 40 and 42 with the aforementioned pulleys 46 and 53, and especially by engagement of the rear rod 42. It will be noted, however, that the discs and shovels will follow the furrows already set up since they are free to move inwardly or outwardly and laterally with respect to the tractor. This lateral movement will be caused by the rolling engagement of the pulleys 46 with the rods 40 and a similar engagement with the pulleys 53 with the rods 42.

A solid square bar 104 passes behind the forward wheels 15 of the tractor and is received in the square hollow members 43 and can include inner stop members at 105 to limit movement of the same. By virtue of the rod 104, the carrying members carrying the discs and shovels will not be distorted with respect to each other and will thus maintain a parallel position, in other words, will be facing directly forwardly at all times regardless of the amount of transverse movement.

Since the discs and shovels are free to move laterally there will be no strain or stress against the tractor and as a result, the side-slippage will be eliminated. The shield members 78 are raised or lowered by merely rotating the handle member 97 about the shaft 92 as an axis. As the rod 92 is thus rotated, it will wind the cable 102 about it and correspondingly raise the end of the rod 74, and due to the pivotal engagement of the rod 74 at the eye 73, as well as the attachment of the shield 78 to the rod 74, as a result the shield 78 will be raised or lowered to any position which is desired and to accommodate deeper furrows and the like.

This adjusting feature is important since the shield can be adjusted to different conditions to prevent covering of small corn and the like and other advantages are readily apparent. The lever 94 which is connected to the handle member 97 is locked against rotation after the height of the shield is set by merely allowing the rod 99 to slip into any of the depressed portions 100. The rod 99 is pressed towards the handle 97 when the handle is rotated. The slot 81 maintains the rods 74 in fixed position and since the slot 81 is slightly larger than the bar 74, angularity of the frame carrying the discs from the center line of the slot 81 will not cause jamming of the bar 74 therein.

The discs 67 can be adjusted inwardly or outwardly by merely loosening the bolts 55, 59 and 61 which allows the bar 57 to be pivoted, the bolts can then be retightened. Similarly the shovels 70a can be positioned as desired by loosening the straps 69 in the same manner and thence retightening by means of bolts 70. The angular positioning of the discs 67 can also be effected in the usual manner at 66.

It will now be seen that I have provided a tractor attachment which includes a cultivating arrangement, which prevents side-slipping of tractors on hills or other slopes, which arrangement is free to move laterally and independently of the tractor itself, that I have provided means cooperatively associated with the laterally movable means to carry shields, that I have provided means for raising or lowering said shields, that I have provided a structure of this type which allows manipulation from the rear of the tractor. It will also be seen that I have provided a structure of this nature which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A cultivating attachment for tractors comprising side frameworks secured to the tractor, laterally movable carriages attached to said frameworks, said frameworks including transverse rods, said carriages adapted to travel along said rods, means for attaching discs and shovels to said carriages, pulleys attached to said carriages adapted to roll along said rods to cause said lateral movement, means for adjustably securing said disc and shovel members to said carriages, a shield member attached to said carriages, means for raising or lowering said shield member.

2. A cultivating attachment for tractors comprising side frameworks secured to the tractor, laterally movable carriages attached to said frameworks, said frameworks including transverse rods, said carriages adapted to travel along said rods, means for attaching discs and shovels to said carriages, pulleys attached to said carriages adapted to roll along said rods to cause said lateral movement, means for adjustably securing said disc and shovel members to said carriages, a shield member attached to said carriages, means for raising or lowering said shield member, including an elevating member attached to the rear axle of a tractor, said elevating member including a vertical slot, a rod attached to said shield member and received within said slot, means for elevating said rod.

3. A cultivating attachment for tractors comprising side frameworks secured to the tractor, laterally movable carriages attached to said frameworks, said frameworks including transverse rods, said carriages adapted to travel along said rods, means for attaching discs and shovels to said carriages, pulleys attached to said carriages adapted to roll along said rods to cause said lateral movement, means for adjustably securing said disc and shovel members to said carriages, a shield member attached to said carriages, means for raising or lowering said shield member, including an elevating member attached to the rear axle of a tractor, said elevating member including a vertical slot, a rod attached to said shield member and received within said slot, means for elevating said rod, including an upper reel attached to said elevating manner, a cable attached between said rods and said reel, means for rotating said reel.

4. A cultivating attachment for tractors comprising side frameworks secured to the tractor, laterally movable carriages attached to said frameworks, said frameworks including transverse rods, said carriages adapted to travel along said rods, means for attaching discs and shovels to said carriages, pulleys attached to said carriages adapted to roll along said rods to cause said lateral movement, means for adjustably securing said disc and shovel members to said carriages, a shield member attached to said carriages, means for raising or lowering said shield member, including an elevating member attached to the rear axle of a tractor, said elevating member including a vertical slot, a rod attached to said shield member and received within said slot, means for elevating said rod, including an upper reel attached to said elevating member, a cable attached between said rod and said reel, means for rotating said reel, including a handle member, a stationary disc member having a plurality of spaced indents about the periphery thereof, said handle including a retractile bar pivoted thereto received within said indents.

5. A cultivating attachment for tractors comprising side frameworks secured to the tractor, laterally movable carriages attached to said frameworks, said frameworks including transverse rods, said carriages adapted to travel along said rods, means for attaching discs and shovels to said carriages, pulleys attached to said carriages adapted to roll along said rods to cause said lateral movement, means for adjustably securing said disc and shovel members to said carriages, a shield member attached to said carriages, means for raising or lowering said shield member, including an elevating member attached to the rear axle of a tractor, said elevating member including a vertical slot, a rod attached to said shield member and received within said slot, means for elevating said rod, including an upper reel attached to said elevating member, a cable attached between said rod and said reel, means for rotating said reel, including a handle member, a stationary disc member having a plurality of spaced indents about the periphery thereof, said handle including a retractile bar pivoted thereto received within said indents, said rods being pivoted at their forward ends to said carriage members.

6. A shield elevating device for tractors comprising a shield member, laterally extending frameworks attached to said tractor to which the forward end of said shield member is pivoted, a further rearwardly extending rod pivoted adjacent to said shield member, means for elevating said rod attached to the tractor axle.

7. A shield elevating device for tractors comprising a shield member, laterally extending frameworks attached to said tractor to which the forward end of said shield member is pivoted, a further rearwardly extending rod pivoted adjacent to said shield member, means for elevating said rod attached to the tractor axle, including a vertical slot for receiving said rearwardly extending rod, a vertical framework for raising said rod including a rotatable reel, a cable wound upon said reel and attached to said rearwardly extending rod, a handle member for rotating said reel.

8. In combination with a tractor, cultivating members attached thereto including a pair of forward and rearward stationary rods, carriages including pulleys attached thereto adapted to roll laterally along said rods, cultivating means attached to said carriages.

9. In combination with a tractor, cultivating members attached thereto including a pair of forward and rearward stationary rods, carriages including pulleys attached thereto adapted to roll laterally along said rods, cultivating means attached to said carriages, said carriages including hollow transverse members, a male guide bar received within said hollow members adapted to maintain parallel positioning of said carriages.

FRANK I. NELSON.